United States Patent
Zietlow et al.

(10) Patent No.: US 6,197,355 B1
(45) Date of Patent: Mar. 6, 2001

(54) METHOD AND APPARATUS FOR PROCESSING AN AERATED CONFECTIONERY FOAM ROPE

(75) Inventors: Philip K. Zietlow, Wayzata; James N. Weinstein, Maple Grove; Michael P. Waldherr, Brooklyn Park, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/392,182

(22) Filed: Sep. 9, 1999

(51) Int. Cl.[7] ................................................ A23G 3/00
(52) U.S. Cl. ........................... 426/289; 426/92; 426/571; 426/660; 426/516; 426/517; 426/518; 425/313; 425/315; 425/316
(58) Field of Search ..................... 426/96, 289, 564, 426/571, 660, 516, 517, 518, 512; 425/311, 312, 313, 314, 315, 316

(56) References Cited

U.S. PATENT DOCUMENTS

| | | | | |
|---|---|---|---|---|
| 2,238,164 | * | 4/1941 | Edwards | 426/516 |
| 3,143,766 | * | 8/1964 | Rohn | 425/313 |
| 3,196,487 | * | 7/1965 | Snelling | 425/168 |
| 3,341,892 | * | 9/1967 | Mayner | 425/168 |
| 3,564,650 | * | 2/1971 | Irving | 425/72.1 |
| 3,607,309 | * | 9/1971 | Olney et al. | 426/571 |
| 4,104,412 | * | 8/1978 | Fischer et al. | 426/572 |
| 4,120,627 | * | 10/1978 | Abe | 425/313 X |
| 4,120,987 | * | 10/1978 | Moore | 426/571 X |
| 4,240,779 | * | 12/1980 | Turk | 425/313 |
| 4,251,561 | * | 2/1981 | Gajewski | 426/571 |
| 4,269,584 | * | 5/1981 | Kroll et al. | 425/313 |
| 4,340,342 | * | 7/1982 | Kim | 425/316 X |
| 4,422,372 | * | 12/1983 | Hoezee | 426/516 X |
| 4,738,404 | * | 4/1988 | Mitchell | 241/285 |
| 4,785,551 | * | 11/1988 | Meyer | 34/10 |
| 4,800,094 | * | 1/1989 | Freda et al. | 426/516 X |
| 4,925,380 | * | 5/1990 | Meisner | 426/516 X |
| 5,019,404 | * | 5/1991 | Meisner | 426/571 X |
| 5,186,959 | * | 2/1993 | Tanaka | 425/315 X |
| 5,532,017 | * | 7/1996 | O'Donnell et al. | 426/571 |
| 5,652,000 | * | 7/1997 | Concoran, Jr. | 425/311 |
| 5,776,534 | * | 7/1998 | Christensen et al. | 426/516 |
| 5,843,503 | * | 12/1998 | Clanton et al. | 426/516 X |
| 5,888,558 | * | 3/1999 | Janot et al. | 425/313 |

* cited by examiner

*Primary Examiner*—Milton Cano
(74) *Attorney, Agent, or Firm*—John A. O'Toole; Douglas J. Taylor; Everett G. Diederiks (57) ABSTRACT

A method for processing at least one rope of aerated confectionery foam. The method includes extruding at least one rope of aerated confectionery foam from an extruder. The rope is conveyed from the extruder to a rotary cutter. An anti-sticking agent, such as powdered starch, is applied to the rope as the rope is conveyed from the extruder to the rotary cutter. Finally, the rope is cut into pieces with the rotary cutter. In one preferred embodiment, the rotary cutter is operated to perform at least 5,000 cuts per minute.

21 Claims, 7 Drawing Sheets

METHOD AND APPARATUS FOR PROCESSING AN AERATED CONFECTIONERY FOAM ROPE

BACKGROUND OF THE INVENTION

The present invention relates to a food processing method and apparatus. More particularly, it relates to a method and apparatus for processing a rope of aerated confectionery foam, such as a marshmallow product, into small pieces on a mass production basis.

Aerated confections or aerated confectionery foams are popular food items. Some aerated confectionery foams include a fat constituent, while others are substantially fat-free. An illustrative, fat-free aerated confectionery foam is the common marshmallow. Such marshmallow products are familiar in both larger and smaller sizes.

It is well-known that such marshmallows when fresh are soft and pliable, but will stale by losing moisture and become hard. Indeed, purposefully pre-dried aerated confectionery foams are also well-known. These products, particularly in smaller or bit sizes, are popularly commonly added to ready-to-eat (RTE) breakfast cereals, especially those marketed to children. Due to their small size (e.g., having a number count of 4–6 per gram), these dried, aerated confectionery marshmallow products are sometimes colloquially referred to as "Mar." bits or "marbits". The marbits must be pre-dried prior to admixture with the RTE cereal in order to reduce unwanted moisture migration from the marbit to the cereal, and thus to forestall the multiple problems resulting therefrom.

While there are many types of aerated confectionery marshmallows on the market, their methods of preparation generally fall into two main process groups: extruded marshmallow and deposited marshmallow. With either type, a sugar syrup and a structuring agent such as an albumin, agar, or preferably a gelatin solution are the two main ingredients. Typically, the sugar syrup is cooled down and then combined with the gelatin solution to form a slurry. The slurry is then aerated to form a foam, and after aeration, desired colors and flavors can then be added to the foam. Alternatively, the colorant can be added prior to aeration. Regardless, a single color can be used to produce a "simple" marbit, or multiple colors in unequal proportions can be employed for a "complex" marbit. The particular marshmallow product may be formed into its final shape by an extrusion process. That is, after aeration, the foam is extruded through die to form a rope. The die imparts the desired peripheral shape (e.g. circle, square, star, irregular shape, etc.) to the extrudate rope. The rope is allowed to rest briefly to stiffen, and then is cut into desired sizes. For dried marshmallows, the process can additionally include one or more drying steps as described, for example, in U.S. Pat. No. 4,785,551.

Substantial efforts have been made to optimize mass production of aerated confectionery foam products, as well as to augment the resulting product. For example, U.S. Pat. Ser. No. 09/107,168, filed on Jun. 12, 1998 and entitled "Process For Aerated Confection" describes an improved mass production technique for preparing candies and confections, especially aerated confections such as marshmallows. Additionally, for example, U.S. Pat. No. 5,019,404 and U.S. patent application Ser. No. 09/107,170, filed on Jun. 15, 1998 and entitled "Multi-Color Aerated Confectionery Products and Processes for Making" both described techniques for forming multi-colored marshmallow products for "complex" marbits on a mass production basis.

While the above-described efforts have been successful achieving lowcost, mass-produced simple and complex marbits, opportunities for further improvements remain. In particular, current processing techniques virtually universally employ a guillotine-type vertical cutter for cutting the extrudate rope into small pieces. This apparatus is shown schematically, for example, in U.S. Pat. No. 5,019,404. While the guillotine-type vertical cutter is undoubtedly serviceable, certain inherent limitations are presented. For example, the guillotine-type vertical cutter can simultaneously cut a number of extrudate ropes during a single cutting cycle. However, each cutting cycle requires both lowering and raising of the cutting blade, typically limiting the maximum number of cuts to less than 1,000 cuts per minute. Obviously, the maximum cuts per minute places an absolute limit on the number of pieces a single cutter is able to produce. Additionally, the blade speed of the guillotine-type cutter during a cutting operation is relatively slow, such that the extrudate rope must be allowed to "set" before a cutting operation. As described in the above-referenced documents, the extrudate rope "sets" with cooling. Therefore, the extrudate rope must be allowed to cool for a relatively long period of time (or "residence time") prior to cutting. The relatively lengthy residence time requirement, in turn, necessarily increases overall production time. Finally, for the same reasons, the guillotine-type vertical cutter cannot cut the extrudate rope into pieces smaller than approximately 0.25 inch (6.35 mm) in thickness. Attempts to produce a smaller thickness marbit typically results in the marbit being deformed.

Aerated confectionery foam products, such as marshmallow or marbits, continue to be extremely popular food items. As such, manufacturers will continue to produce large quantities of these products, and therefore highly desire any available cost savings in the mass production thereof. To this end, prior art processing techniques incorporating a guillotine-type vertical cutter present certain inherent processing limitations. Therefore, a need exits for a method and apparatus for processing an aerated confectionery foam rope into small pieces at increased rates.

SUMMARY OF THE INVENTION

One aspect of the present invention relates to a method of processing at least one rope of aerated confectionery foam. The method includes extruding at least one rope of aerated confectionery foam from an extruder. The rope is then conveyed from the extruder to a rotary cutter. An anti-sticking agent is applied to the rope as the rope is conveyed from the extruder to the rotary cutter. Finally, the rope is cut into pieces with the rotary cutter. In one preferred embodiment, the rotary cutter is operated to perform at least 5,000 cuts per minute.

Another aspect of the present invention relates to a system for processing at least one rope of aerated confectionery foam. The system includes an extruder, a conveyor and a rotary cutter. The extruder is configured to extrude at least one rope of aerated confectionery foam. The conveyor conveys the rope from the extruder, and terminates in a leading end. The rotary cutter device is positioned proximate the leading end of the conveyor. In this regard, the rotary cutter device is configured to cut the rope into pieces at a rate of at least 5,000 cuts per minute.

Yet another aspect of the present invention relates to a mass produced marbit flake to be added to a ready-to-eat cereal. The marbit flake is an aerated confectionery foam having a thickness of less than 0.125 inch (3.175 mm). In one preferred embodiment, the marbit has a thickness of approximately 0.0625 inch (1.5875 mm).

Yet another aspect of the present invention relates to a mass produced marbit flake to be added to a ready-to-eat cereal. The marbit flake is an aerated confectionery foam having a length:thickness aspect ratio of in the range of approximately 32:5–48:5.

DETAILED DESCRIPTION OF THE PREFERRED EMBODIMENTS

The present invention provides an improved method and apparatus for processing an extruded rope of an aerated confectionery foam food product, such as marshmallow, into small pieces or bits. Obviously, prior to processing in accordance with the present invention, the extrudate rope must be formed. Creation of an aerated confectionery foam rope can be done in a wide variety of fashions, detailed examples of which are described in U.S. patent application Ser. No. 09/107,168, filed on Jun. 12, 1998 and entitled "Process For Aerated Confection"; U.S. patent application Ser. No. 09/107,170, filed on Jun. 15, 1998 and entitled "Multi-Colored Aerated Confectionery Products And Processes For Making"; and U.S. Pat. No. 5,019,404 entitled "Multi-Color Confection Extrusion System", the teachings of which are incorporated herein by reference. As a point of reference, FIG. 1 provides a schematic flow diagram of a simplified method for preparing an extrudate rope of aerated confectionery foam, it being understood that a number of variations to the method shown in FIG. 1 can be employed and are well known in the art.

Figure 1:
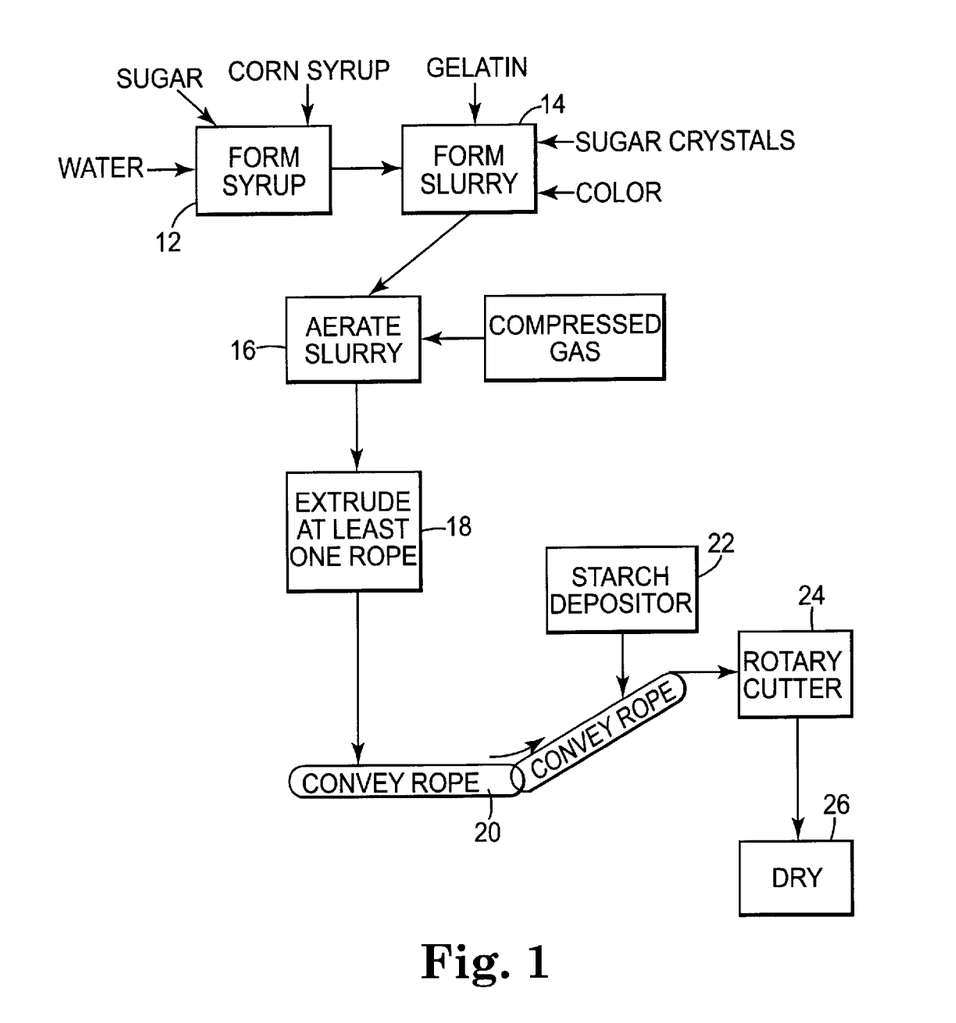
FIG. 1 is a schematic process flow diagram of a method of preparing an aerated confectionery foam product.

With the above background in mind, one embodiment of a method of producing an extrudate rope of aerated confectionery foam is referred generally in FIG. 1 by reference numeral 10. An essential first step 12 includes forming a clear, concentrated sugar syrup. In one preferred embodiment, the syrup is an admixture of water and sugar, and a portion of corn syrup that is heated to sufficiently dissolve the sugar, but to avoid burning.

Following cooling of the syrup, a slurry is formed at step 14. The slurry is essentially an admixture of the syrup formed at step 12 with a stabilizing or structuring agent, preferably a suitable gelatin agent (such as a gelatin-in-water solution or slurry). In one variation, the step 14 can optionally comprise admixing or seeding the slurry with sugar crystals. The sugar crystals can be seeded either to the slurry (i.e., after adding the gelatin structuring ingredient) or the sugar syrup (i.e., before addition of the gelatin).

Where desired, a coloring agent, such as a food dye or colorant, may be added to the slurry at step 14. The colorant can be a finely divided particulate, or preferably is a water soluble dye. As described in the above references, the selected coloring agent can be added to a single batch of slurry to produce a resulting aerated confectionery foam having that single color. Alternatively, several batches of slurry can be formed to have different colors, and subsequently combined to produce a multi-colored (or complex) rope. Alternatively, the coloring agent can be added following aeration at step 16, or may be omitted entirely.

Aeration of the slurry occurs at step 16, such as by the addition of compressed gas. Aeration is well known in the art, and typically entails injection of nitrogen gas or clean air or other suitable gas into the slurry.

The aeration step 16 forms an aerated confectionery foam stream or streams. One or more of the streams are fed to an extruder that, in turn, extrudes at least one extrudate rope of aerated confectionery foam at step 18. The resulting rope is plastic, characterized by a peripheral pattern or shape such as a circle, star, animal figure or other shape including both regular or irregular shape as defined by the extruder. Depending upon the extrusion technique and the number of streams present, the extrudate rope can be uni-colored or multicolored, having various internal portions or pigments. By "plastic" is meant that the temperature of the extrudate is above the set point temperature of the foam structuring agent. As a result, the rope of extruded foam is easily deformable at these elevated temperatures.

The extrudate rope is then conveyed from the extruder at step 20. As described in greater detail below, the conveying step 20 can be carried out by one or more conveyors (two are shown schematically in FIG. 1). The conveyor(s) have an overall length and are operated at a feed rate sufficient to allow the rope to at least partially cool, and therefore at least partially "set" or solidify. Notable, a plurality of extruders can simultaneously feed individual ropes onto the conveyor, such that a plurality of ropes are subsequently processed simultaneously.

At step 22, prior to cutting or severing, the rope is substantially uniformly coated with an anti-sticking agent, such as powdered starch or a powdered starch-sugar mixture. The anti-sticking agent minimizes sticking of pieces during a subsequent cutting operation at step 24.

Cutting of the rope into multiple pieces at step 24 is facilitated, in accordance with the present invention, with a rotary cutter. The rotary cutter is described in greater detail below. As a point of reference, however, it is noted that prior art cutting techniques relied upon a guillotine-type reciprocating vertical cutter. With a rotary cutter of the present invention, overall cycle time is enhanced dramatically due to the increased number of cuts per minute available.

Finally, after the rope(s) are cut into individual pieces, the preparation of a dried aerated confectionery product, such as a marbit, includes a finish drying step 26 whereby each of the individual pieces are destarched and dried. Any suitable drying technique that will reduce the moisture content to about 2–4% is adequate. The resulting dried pieces can then be consumed as confections.

Once again, as is known in the art, the above process steps can be varied widely and/or additional steps added to produce an extrudate rope or ropes of aerated confectionery foam. The method and apparatus of the present invention is focused upon processing of the rope(s) following extrusion.

Figure 2:
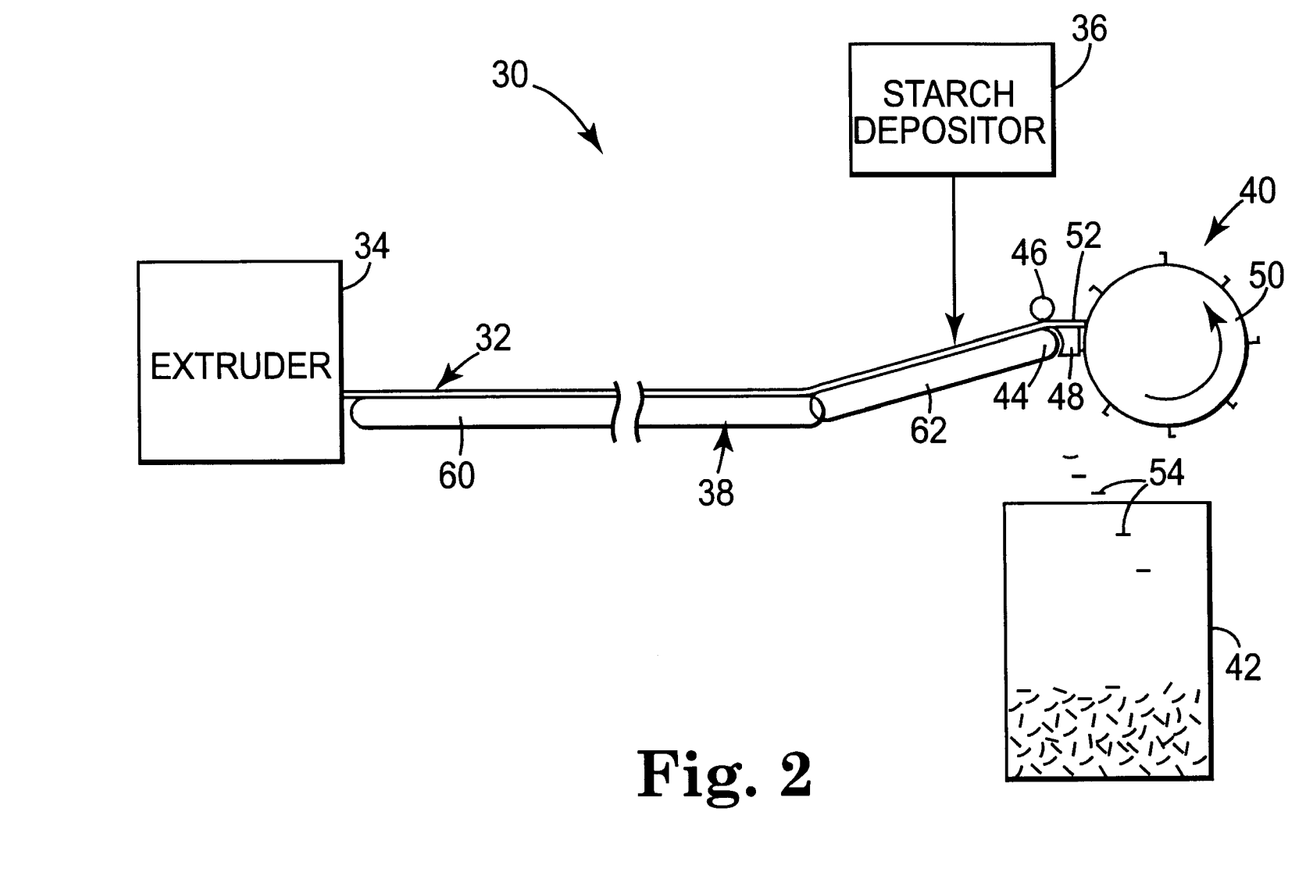
FIG. 2 is a schematic view of a system for processing an aerated confectionery foam rope in accordance with the present invention.

In particular, FIG. 2 depicts schematically a system 30 for processing at least one rope of aerated confectionery foam 32. The system 30 includes an extruder 34, a starch depositor 36, a conveyor system 38, a rotary cutter device 40 and a collection hopper or bin 42. The various components are described in greater detail below. Generally speaking, however, the conveyor system 38 delivers the rope 32 from the extruder 34 to the rotary cutter device 40. The starch depositor 36 distributes a volume of an anti-sticking agent, such as powdered starch, on to the rope 32 prior to the rope 32 being engaged by the rotary cutter device 40. To this end, a leading end 44 of the conveyor system 38 is positioned adjacent the rotary cutter device 40 and preferably operates in conjunction with a drive roller 46 for consistently directing a length of the rope 32 to the rotary cutter device 40. The rotary cutter device 40 generally includes an anvil support bar 48 and a rotary cutter 50. The rope 32 is directed from the conveyor system 38 to the anvil support bar 48, which in turn properly positions a leading portion 52 of the rope 32 relative to the rotary cutter 50. The rotary cutter 50 cuts or severs the rope 32 into small pieces 54 during a cutting operation. The pieces 54 are collected within the hopper 42 and prepared for subsequent processing, such as drying.

The extruder 34 is of a type commonly known in the art, and can include a single or multiple stream manifold. The extruder 34 typically includes an outlet die configured to impart a desired peripheral shape to the rope 32. Further, the extruder 34 can be configured to produce one or more of the ropes 32.

Similarly, the starch depositor 36 is of a type commonly known in the art. The starch depositor 36 is positioned above the conveyor system 38 and is configured to coat the rope 32 with an anti-sticking agent, such as powdered starch. In this regard, a location of the starch depositor along a length of the conveyor system 38 can be varied from that shown in FIG. 2.

Figure 3:
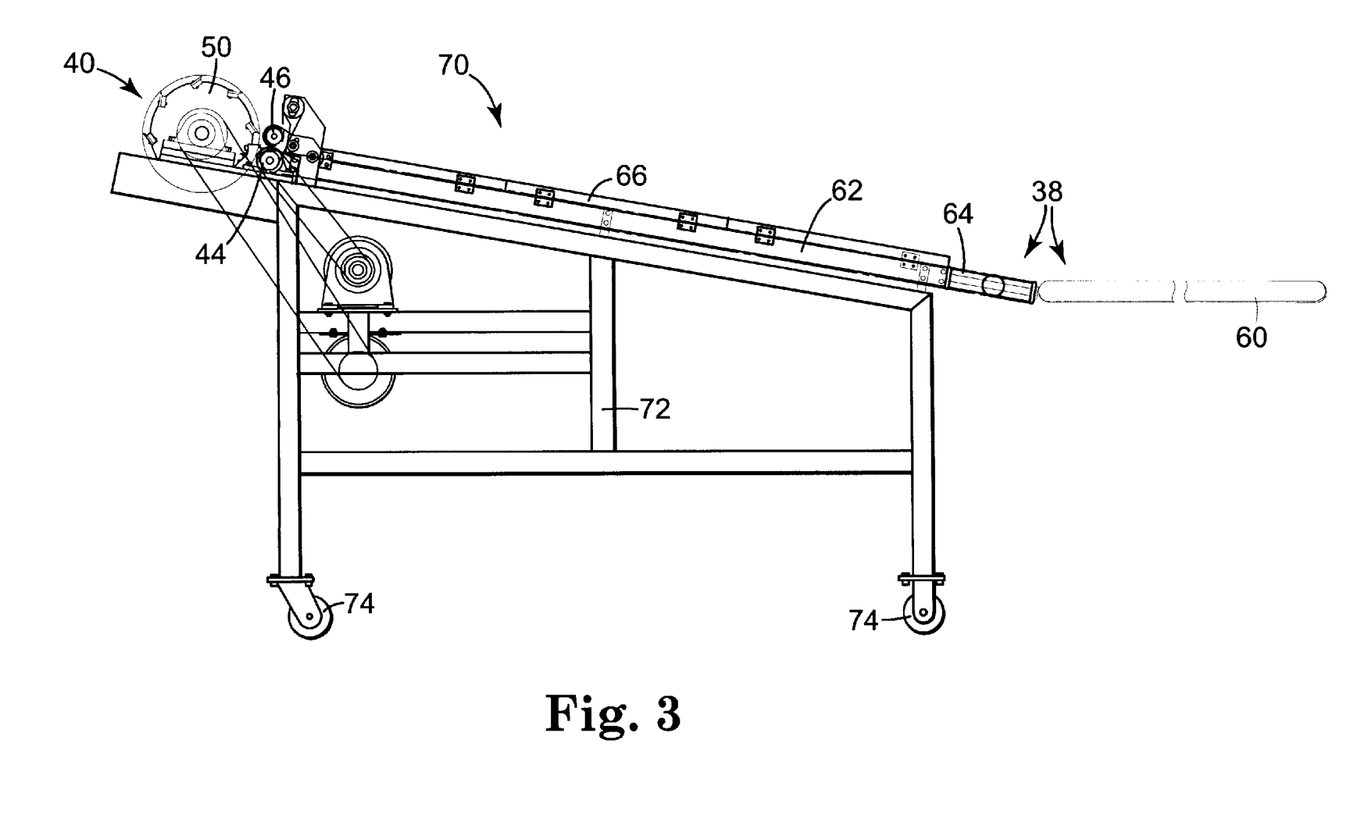
FIG. 3 is a side view of one preferred embodiment of a system for processing an aerated confectionery foam rope.

The conveyor system 38 can assume a wide variety of forms, and can include one or more independent, endless conveyor belts. For example, with reference to FIG. 2, the conveyor system 38 can include a first conveyor 60 for receiving and conveying the rope 32 from the extruder 34, and a second conveyor belt 62 positioned to receive the rope 32 from the first conveyor 60 and deliver the rope 32 to the rotary cutter device 40. As is known in the art, this dual conveyor approach allows the conveyor belts associated with the conveyors 60, 62 to be made of varying materials and to have varying delivery configurations. For example, FIG. 3 depicts one preferred embodiment of a portion of the system 30, and shows the conveyor system 38 as including the first conveyor 60 (shown schematically) and the second conveyor 62. The second conveyor 62 can be relatively shorter than the first conveyor 60, and includes an endless belt 64 having a "roughened" surface. This roughened attribute allows powdered starch distributed from the starch depositor 36 to accumulate within the grooves (not shown) of the belt 64 for application of the powdered starch to a lower surface of the rope 32 (FIG. 2). The conveyor 62 can incorporate side guards 66 (one of which is shown in FIG. 3) for constraining movement of the rope 32 along a width of the conveyor belt 64.

As a point of reference, FIG. 3 depicts the second conveyor 62 and the rotary cutter device 40 as a unitary processing device 70, supported by a frame 72 and wheels 74. The wheels 74 allow the processing device 70 to be easily maneuvered to various locations, and therefore can be used with any number of differently sized and located first conveyors 60. In one preferred embodiment, the conveyor 62 associated with the processing device 70 is orientated within the frame 72 to extend upwardly to the leading end 44 at an angle of approximately 15° relative to horizontal. This preferred angular orientation facilities subsequent engagement by the rotary cutter device 40. Alternatively, other orientations can be employed, including a horizontal position. Further, in one preferred embodiment, the conveyor belt 64 has a conveying length of five feet (1.5 meters) and an available surface width of 20 inches (510 mm). Other dimensions, either greater or smaller, are equally acceptable The leading end 44 of the conveyor 62, along with other components, are shown in greater detail in FIG. 4. The conveyor 62 nests within the frame 72 and includes, in part, the endless belt 64 and a pulley 80. The conveyor 62 operates in conjunction with the drive roller 46 that includes a shaft 82. The leading end 44 of the conveyor 62 is defined by the pulley 80. The drive roller 46 is positioned above the leading end 44 of the conveyor 62 such that a center axis of the drive roller 46 is aligned with a center axis of the pulley 80. Notably, the drive roller 46 is preferably slightly spaced from the conveyor belt 64 to provide a gap 84. In this regard, the shaft 82 of the drive roller 46 is connected to a vertical support plate 86, that in turn is secured to a support frame 88. The support frame 88 is attached to the frame 72 to secure the drive roller 46 at a desired position relative to the frame 72 and thus the conveyor 62. Preferably, the vertical support plate 86 is configured to be moveable relative to the support frame 88, such that a vertical position of the drive roller 46 relative to the conveyor belt 64 can be altered. With this feature, a size or height of the gap 84 is variable and can be selected in accordance with a size of the rope 32 (FIG. 2) being processed. In other words, an operator (not shown) can form the gap 84 to be slightly smaller than a height or thickness of the rope 32 such that the rope 32 is consistently and uniformly engaged by the conveyor 62 drive roller 46.

Figure 4:
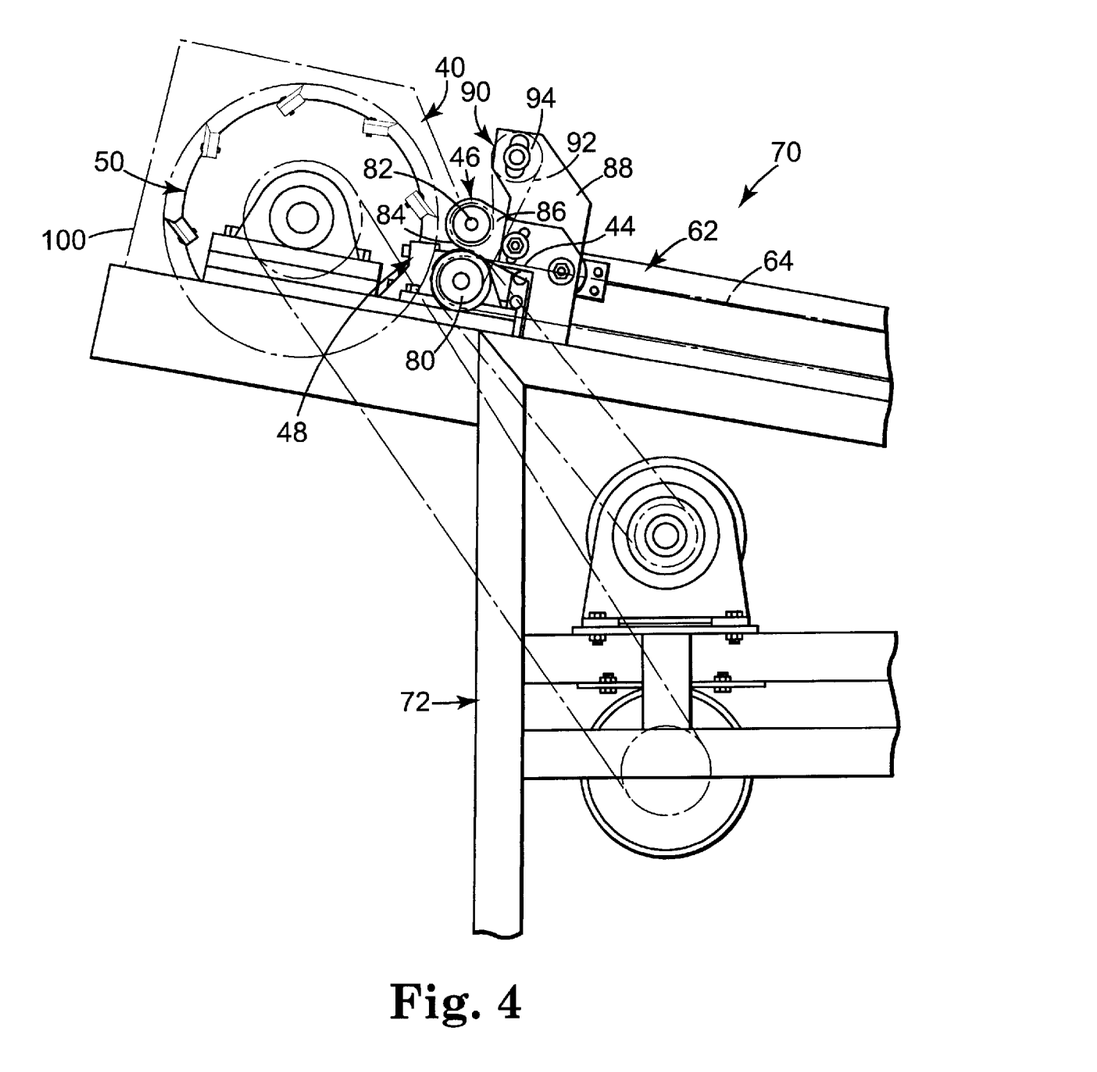
FIG. 4 is an enlarged view of a portion of the system of FIG. 3.

In a preferred embodiment, the drive roller 46 is rotated at a speed corresponding with a speed of the conveyor 38. To this end, the processing device 70 preferably includes a timing mechanism, shown generally at 90. The timing mechanism 90 comprises a timing belt 92 and a tension roller 94. The timing belt 92 articulates along and operably associates the pulley 80, the tension roller 94 and the drive roller 46. For example, each of the pulley 80, the tension roller 94 and the drive roller 46 can include toothed surfaces that are engageable by the timing belt 92. Rotation of the pulley 80 (otherwise resulting in movement of the conveyor belt 64) by a motor (not shown) is translated to the timing belt 92, causing the timing belt 92 to move. Movement of the timing belt 92 is translated to the drive roller 46, via the tension roller 94, such that the drive roller 46 rotates at the same speed and in a rotational direction opposite that of the pulley 80. For example, where the pulley 80 is driven in a clockwise direction, the tension roller 94 directs the tension belt 92 to contact and drive the drive roller 46 in a counterclockwise direction. Importantly, the drive roller 46 is rotated at the same speed as the pulley 30, and thus at a speed corresponding with a speed or feed rate of the conveyor belt 64. Alternatively, other timing mechanisms can be employed, whereby the drive roller 46 is driven independent of the conveyor 62.

The rotary cutter device 40 includes the anvil support bar 48, the rotary cutter 50, a shroud 100 (shown in phantom in FIG. 4 for ease of illustration) and a vacuum source (not shown). Each component of the rotary cutter device 40 is described in greater detail below. Generally, however, the anvil support bar 48 presents and maintains the rope 32 (FIG. 2) for the cutting by the rotary cutter 50. The shroud 100 acts as a guard for the rotary cutter 50, and, along with the vacuum source, limits external dispersion of starch particles.

Figure 5:
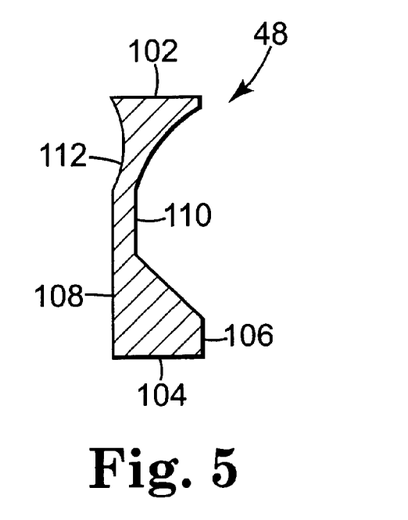
FIG. 5 is a cross-sectional view of an anvil support bar portion of FIG. 4.

The anvil support bar 48 is positioned between the leading end 44 of the conveyor 62 and the rotary cutter 50. The anvil support bar 48 is an elongated body, having a length slightly greater than a width of the conveyor 62. Thus, in one preferred embodiment, the anvil support bar 48 has a length of 23.75 inches (600 mm), although other lengths are equally acceptable. As shown in greater detail in FIG. 5, the anvil support bar 48 is integrally formed from a rigid material, preferably 304 stainless steel, and defines a top wall 102, a bottom wall 104, a first side wall 106 and a second side wall 108. The top wall 102 is highly flat for receiving the rope(s) 32 (FIG. 2), defining a preferred width of 2.75 inches (69.8 mm). The side walls 106, 108 extend between the top wall 102 and the bottom wall 104. As a point of reference, the first side wall 106 is configured for placement adjacent the leading end 44 (FIG. 4) of the conveyor 62 (FIG. 4), whereas the second side wall 108 is configured for placement adjacent the rotary cutter 50 (FIG. 4).

With the above-described orientation of the anvil support bar 48 in mind, the first side wall 106 preferably forms a recess 110. The recess 110 is substantially concave, and is sized to provide clearance for the leading end 44 (FIG. 4) of the conveyor 62 (FIG. 4). With this configuration, the leading end 44 of the conveyor 62 extends within the recess 110 so that the top wall 102 is substantially contiguous with the conveyor 62 upon final assembly. Thus, the recess 110 is signed in accordance with a radius of the pulley 80 (FIG. 4).

The second side wall 108 includes a guide surface 112 formed to extend from the top wall 102. During a cutting operation, the guide surface 112 directs cut pieces (not shown) away from the top wall 102. As described below, a corner formed by the top wall 102 and the second side wall 108 will be slightly spaced from the rotary cutter 50 (FIG. 4) to provide clearance for individual blades. However, due to the pliable nature of aerated confectionery foam, it may be possible for cut pieces to undesirably accumulate along the top wall 102. Thus, in one preferred embodiment, the guide surface 112 is recessed relative to a remainder of the second side wall 108. This recessed configuration limits a build-up of cut pieces from occurring adjacent or along the top wall 102 by providing an increased clearance region for cut pieces to fall within. To this end, the guide surface 112 is preferably concave, thereby promoting rapid removal of cut pieces from the top wall 102. Alternatively, however, the guide surface 112 need not be recessed.

Figure 6A:
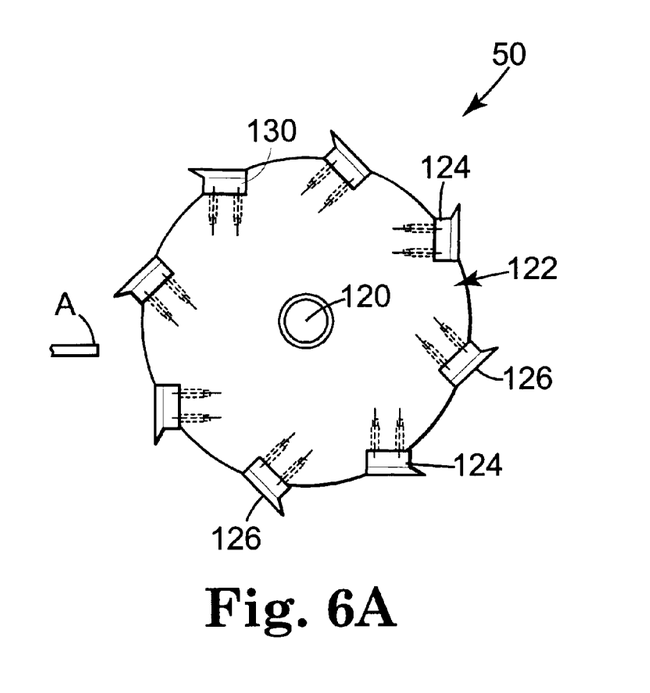
FIG. 6A is a side view of a portion of a rotary cutter in accordance with the present invention.
Figure 6B:
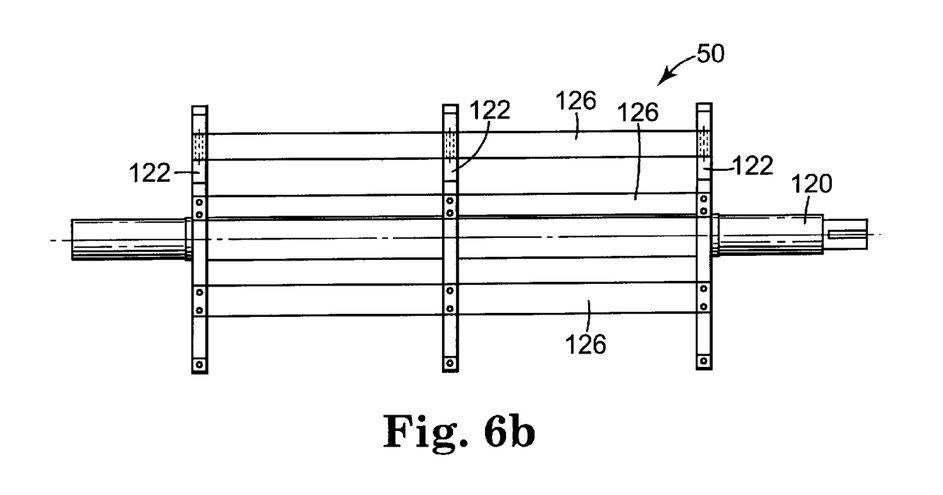
FIG. 6B is a top view of the rotary cutter of the FIG. 6A.

The rotary cutter 50, shown in greater detail in FIGS. 6A and 6B, includes a central shaft 120, housing plates 122, a plurality of back-up bars 124 and a plurality of blades 126. Generally speaking, the housing plates 122 are spaced along, and extend radially from, the central shaft 120. Individual pairs of the back-up bars 124 and the blades 126, respectively, are secured to the housing plates 122.

The housing plates 122 are each integrally formed of a rigid material, preferably 304 stainless steel. In one preferred embodiment, three of the housing plates 122 are provided, although any other number, either greater or smaller, can be employed. The housing plates 122 extend radially from the central shaft 120, are preferably equidistantly spaced, for example by approximately 9.75 inches (250 mm). The outer two of the housing plates 122 define an overall cutting length of 20 inches in one preferred embodiment. As best shown in FIG. 6A, each of the housing plates 122 are generally circular discs, defining a plurality of equidistantly spaced blade receiving regions 130. The number of blade receiving regions 130 corresponds with the number of the blades 126. Thus, in one preferred embodiment, each of the housing plates 122 form eight of the blade receiving regions 130, equidistantly spaced by 45°. As a point of reference, during a cutting operation, it is desired that each of the blades 126 engage and cut the rope 32 (FIG. 2) at a cutting point (A in FIG. 6A). With this in mind, the blade receiving regions 130 are configured to position a respective blade 126 at the cutting point A such that the blade 126 is substantially perpendicular to the rope 32 (FIG. 2) being cut. Thus, in one preferred embodiment, each of the blade receiving regions 130 form a 90° recess, although other configurations are equally acceptable.

The back-up bars 124 are each integrally formed from a rigid material, such as 17-4 stainless steel, and are sized to extend along the housing plates 122, having a preferred length of approximately 20 inches (510 mm). Each of the back-up bars 124 are provided to define a desired spacing of one of the blades 126, respectively, from the housing plates 122. Thus, in one preferred embodiment, each of the back-up bars 124 have a thickness of approximately 0.44 inch (11 mm), although other dimensions may also be useful. Finally, each of the back-up bars 124 are preferably configured so as to not interfere with the respective blades 126 during a cutting operation. Thus, in one preferred embodiment, each of the back-up bars 124 taper from an outer surface thereof, in accordance with a cutting angle formed by the respective blade 126 (described below), between each of the housing plates 122 (as best shown in FIG. 6B).

Figure 7:
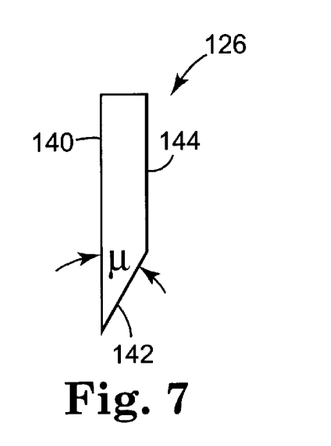
FIG. 7 is a top view of a blade used with the rotary cutter of FIG. 6A.

With reference to FIG. 6A and 7, each of the blades 126 extend along a perimeter of the housing plates 122. As best shown in FIG. 7, each of the blades 126 defines a material face 140, a rake face 142 and a guide face 144. The material face 140 and the rake face 142 combine to form a cutting angle α The cutting angle α is preferably in the range of approximately 20°–50°, more preferably in the range of 30°–40°. In one preferred embodiment, the cutting angle α is 36°. As described in greater detail below, each of the blades 126 are secured to the housing plates 122 (FIG. 6A) such that the blades 126 interact with and cut the rope 32 (FIG. 2) in the cutting position shown in FIG. 7. Thus, in a preferred embodiment, each of the blades 126 are formed such that in the cutting position, the material face 140 and the guide face 144 are substantially perpendicular to the rope 32 so as to form a relatively uniform cut piece.

Each of the blades 126 are integrally formed from a rigid material, preferably heat treated 17-4 stainless steel. Other rigid materials, such as plastic or ceramic, can alternatively be employed. Due to the relatively high rate at which the blades 126 will cut through an aerated confectionery foam rope, it is preferred that the material selected for the blade 126 cause a small amount of friction to occur between the guide face 144 and the aerated confectionery foam being cut. With this preferred design characteristic, the cut piece will temporarily adhere to the guide face 144 so that the guide face 144 can carry the cut piece away (downwardly relative to the orientation of FIG. 7.) from the rope 32 (FIG. 2). Without this preferred frictional interaction, the cut piece may fly upwardly and undesirably contact another one of blades 126. Conversely, however, the material face 140 is preferably configured to limit material build-up. Thus, in one preferred embodiment, the material face 140 is coated is an anti-stick material, such as bees wax.

Each of the blades 126 are preferably sized in accordance with a clearance provided by the blade receiving zones 130 (FIG. 6A). For example, in one preferred embodiment, each of the blades 126 has a width of 1.55 inches (39.4 mm) and a thickness of 0.188 inch (4.77 mm), although other dimensions are equally acceptable. Further the blades 126 can be formed to a greater thickness, thereby eliminating a need for the respective back-up bars 124 (FIG. 6A).

Figure 8:
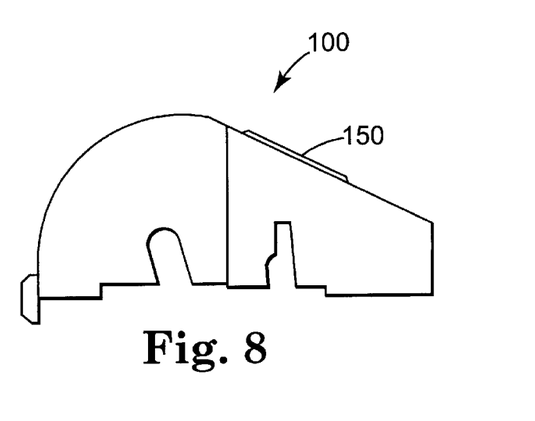
FIG. 8 is a side view of a shroud used with the rotary cutter of FIG. 6A.

Finally, one preferred embodiment of the shroud 100 is shown in FIG. 8. The shroud 100 is configured to encompass the rotary cutter 50 (FIG. 4), and preferably includes a visual inspection plate 150. The viewing plate 150 is clear for viewing of the rotary cutter 50 during operation. The shroud 100 serves to not only guard against potential operator injuries during operation of the rotary cutter 50, but also to capture starch dust. To this end, and as described in greater detail below, a negative pressure is preferably created within the shroud 100 by the vacuum source (not shown) to collect starch dust.

With reference to FIG. 4, assembly of the processing device 70 is substantially as follows. The rotary cutter 50 is first assembled by securing the housing plates 122 to the central shaft 120. The housing plates 122 are equidistantly spaced along the central shaft 120, preferably by a distance of approximately 9.75 inches. With this spacing, the outer two housing plates 122 define a preferred overall cutting length of approximately 20 inches. When properly assembled, the respective blade receiving zones 130 of the housing plates 122 are aligned. Individual pairs of the back-up bars 124 and the blades 126 are then assembled to the housing plates 122. For example, one of the back-up bars 124 is placed within one aligned set of the blade receiving zones 130. One of the blades 126 is placed on top of the previously placed back-up bar 126. The two components are then secured to the housing plates 122. For example, bolts can be used to secure respective pairs of the back-up bars 124 and the blades 126 to the housing plates 122.

The assembled rotary cutter 50 is then secured to the frame 72. The anvil support bar 48 and the conveyor 62 are similarly secured to the frame 72. In one preferred embodiment, the anvil support bar 48 is positioned as close as possible to the rotary cutter 50, while still allowing for clearance of the blades 126. In this regard, a slight clearance of 0.005 inch (0.127 mm) is preferably provided between the top wall 102 (shown best in FIG. 6) of the anvil support bar 48 and the rotary cutter 50. The shroud 100 is secured over the rotary cutter 50. In a preferred embodiment, the vacuum source (not shown) is fluidly connected to an interior of the shroud 100. During use, the vacuum source creates a negative pressure within the shroud 100 to remove starch dust generated during operation of the rotary cutter 50. Finally, the starch depositor 36 is secured over the conveyor 62

Figure 9:
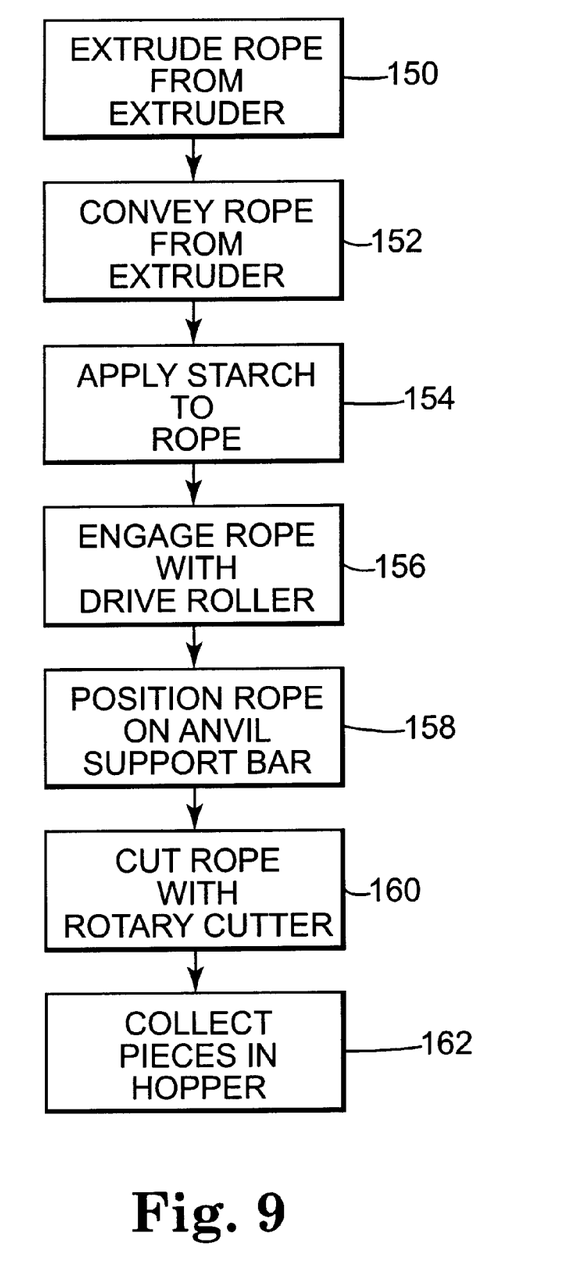
FIG. 9 is a process flow diagram of a method for processing an aerated confectionery foam rope.

Following assembly, the processing device 70 is used to process at least one extrudate rope of aerated confectionery foam, as shown schematically in FIG. 3 and diagrammatically in FIG. 9. The at least one rope 32 is extruded from the extruder 34 at step 150. The rope 32 is conveyed from the extruder 34 by the conveyor system 38 at step 152. As previously described, the conveyor system 38 can be comprised of one or more individual conveyors, such as the conveyors 60, 62. Regardless, the conveyor system 38 has an overall length (defined as a distance from an exit of the extruder 34 to the anvil support bar 48) and an operational speed configured to allow the rope 32 to partially set slightly during a residence time period (e.g. time period from extrusion to cutting). In one preferred embodiment, the conveyor system 38 is operated at a feed rate of 100 feet per minute (30.5 meters per minute) and has an overall length of less than 100 feet (30.5 meters) so as to provide a residence time period of less than sixty seconds. More preferably, the conveyor system 38 has a length of less than 42 feet (12.8 meters) so as to provide a residence time period of less than twenty-five seconds. Even more preferably, the conveyor system 38 has an overall length of approximately 36.7 feet (11.2 meters) so as to provide a residence time period of twenty-two seconds. Obviously, the conveyor system 38 can be operated at different feed rates and/or have different lengths to provide a residence time period of less than sixty seconds, more preferably less than twenty-five seconds, most preferably twenty-two seconds. Even further, the conveyor system 38 can be configured to provide a residence time period of less than twenty-two seconds. In this regard, due to the elevated cutting rate available with the rotary cutter 50 (described below), it is possible that the rope 32 will need a residence time period of only a few seconds, and still be properly cut.

As the rope 32 is conveyed from the extruder 34, an anti-sticking agent, such as powdered starch, is applied to the rope 32 by the starch depositor 36 at step 154. The powdered starch is preferably applied just prior to engagement of the rope 22 by the rotary cutter device 40. As is known in the art, the starch depositor 36 is positioned along a length of the conveyor system 38 such that the powdered starch is applied approximately two seconds prior to a cutting operation, although other locations are equally acceptable. The powdered starch is preferably applied at a volumetric rate sufficient to accommodate a conveyor feed rate of 100 feet per minute (30.5 meters per minute). Thus, in one preferred embodiment, the starch depositor 36 releases approximately 20 pounds per minute of the powdered starch where a single rope 32 is being processed. Additional volume of starch is required where a plurality of ropes 32 are simultaneously processed. For example, for simultaneous processing of ten of the ropes 32, the starch is applied at a rate of approximately 200 pounds per minute. It will be recalled that the portion of the conveyor system 38 beneath and down stream of the starch depositor 36 (such as the conveyor 62) preferably includes a "roughened" conveyor belt able to retain starch and therefore distribute starch to a bottom side of the rope 32.

As the rope 32 nears the leading end 44 of the conveyor system 38, the rope 32 is engaged by the drive roller 46 at step 156. As previously described, the drive roller 46 is driven at a speed corresponding with that of the conveyor system 38. Further, the gap 84 formed by the drive roller 46 and the conveyor system 38 is selected in accordance with a thickness of the rope 32. Thus, the operator (not shown) can maneuver the drive roller 46 to provide a gap 84 slightly smaller than a thickness of the rope 32. As the rope 32 enters the gap 84, the drive roller 46 and the conveyor system 38 engage and direct the rope 32 toward the rotary cutter device 40.

At step 158, the rope 32 passes from the conveyor system 38 to the top wall 102 of the anvil support bar 48. The anvil support bar 48 maintains the rope 32 at a level for optimal cutting by the rotary cutter 50.

At step 160, the rotary cutter 50 cuts the rope 32 into the pieces 54. The rotary cutter 50 is preferably operated to perform at least five thousands cuts per minute. Thus, in the preferred embodiment, where the rotary cutter 50 includes eight of the blades 126, the rotary cutter 50 is rotated at a rate of 625 revolutions per minute. Obviously, where the rotary cutter 50 includes a different number of the blades 126, the rotary cutter 50 is rotated at a correspondingly different rate.

Notably, the rotary cutter 50 will generate a large amount of starch dust during the cutting operation. While the rotary cutter device 40 is preferably provided with the shroud 100 and a negative pressure for containing and removing this starch dust, experiments have shown that at extremely high rotational speeds, the amount of starch dust will exceed the collection capabilities of the rotary cutter device 40. A comparison of available cutting speed with dust generation has revealed an optimal configuration of the rotary cutter 50 to include eight of the blades 126 and an operational speed of 625 revolutions per minute.

The individual pieces 54 cut from the rope 32 are directed by the rotary cutter 50 to the hopper 42 at step 162. The hopper 42 preferably includes a screen (not shown) that collects the pieces 54, yet allows the starch dust to pass through. With this approach, the hopper 42 effectively separates starch from the pieces 54 of confection. In one preferred embodiment, to assist in this separation, the hopper 42 vibrates, such that the hopper 42 may include an orbital vibration device.

The method and apparatus of the present invention efficiently processes one or more ropes 32 of aerated confectionery foam into small pieces, for example marbits. Due to the speed at which the rope 32 is cut via the rotary cutter 50, individual pieces or marbits can be formed highly thin as compared to previous mass-production techniques. That is to say, prior art guillotine-type vertical cutters cannot produce individual pieces or marbits having a thickness of less than 0.25 inch. This limitation is due in large part to the relatively slow speed of the vertical cutter, as well as the deformation characteristics of the aerated confectionery foam rope. Simply stated, during a cutting operation with a guillotine-type vertical cutter, the aerated confectionery foam material will deform and stretch outward. In direct contrast, the rotary cutter and related method of the present invention provides for a greatly increased cutting speed at which only minimal, if any, rope deformation occurs. Therefore, by altering either the feed rate of the conveyor or the cutting (or rotational) rate of the rotary cutter, the method and apparatus of the present invention can produce an aerated confectionery foam piece (or marbit) having a thickness of less than 0.25 inch (6.35 mm), preferably less than 0.125 inch (3.175 mm), and even more preferably approximately 0.0625 inch (1.587 mm). As a point of reference, marbits normally included with ready-to-eat cereals have a thickness of approximately 0.25 inch (6.35 mm) and a maximum length of 0.4–0.6 inch (10.2–15.2 mm) (it being recalled that individual marbits may assume a wide variety of shapes). Stated otherwise, currently available marbits used with ready-to-eat cereals have a length:thickness aspect ratio in the range of approximately 8:5–12:5. The method and apparatus of the present invention can produce similarly configured marbits. Additionally, however, the method and apparatus of the present invention can produce marbits having a length:thickness aspect ratio in the range of approximately 16:5–48:5; more preferably in the range of 32:5–48:5.

The method and apparatus of the present invention provides a marked improvement over previous processing techniques by incorporating a rotary cutter to cut a rope of aerated confectionery foam into small pieces. Overall production capabilities are greatly enhanced due to the increased number of cuts that can be performed with the rotary cutter. Further, the rotary cutter facilitates a greatly reduced residence time period for the rope, again improving production cycle time. Finally, marbit flakes of reduced thickness can be consistently manufactured on a mass production basis.

Although the present invention has been described with reference to preferred embodiments, workers skilled in the art will recognize that changes can be made in form and detail without departing from the spirit and the scope of the present invention. For example, the method and apparatus of the present invention has been described with reference to processing of a single rope of aerated confectionery foam. Alternatively, a number of ropes can simultaneously be processed, thereby increasing overall productivity. For example, the method and apparatus of the present invention can be used to process ten or twenty ropes simultaneously. Additionally, throughout this specification, certain dimensions have been ascribed to various components, spacings, etc. Where provided, these specific dimensions relate to one preferred embodiment of the preferred system and related method. That is to say, a wide variety of other dimensions can alternatively be employed.

What is claimed is:

1. A method of processing at least one rope of aerated confectionery foam, the method comprising:

extruding at least one rope of aerated confectionery foam from an extruder;

conveying the rope from the extruder and directing a leading edge of the rope upon a stationary anvil;

applying an anti-sticking agent to the rope as the rope is conveyed from the extruder to the anvil;

passing the leading edge of the rope beyond the anvil;

rotating a rotary cutter having a plurality of circumferentially spaced blades to cause one of the plurality of blades to come into contact with the leading edge of the rope extending beyond the anvil;

cutting the leading edge of the rope with the rotary cutter;

extending successive leading edges of the rope beyond the anvil; and continuing to cut the rope into pieces with each successive leading edge being sliced off by a respective one of the plurality of blades.

2. The method of claim 1, wherein the rope is conveyed from the extruder to the rotary cutter over a residence time period of less than 60 seconds.

3. The method of claim 2, wherein the residence time period is less than 25 seconds.

4. The method of claim 3, wherein the residence time period is approximately 22 seconds.

5. The method of claim 1, wherein the anti-sticking agent is powdered starch.

6. The method of claim 5, wherein applying the powdered starch includes distributing 20–25 pounds of powdered starch per minute for a single rope of aerated confectionery foam.

7. The method of claim 1, wherein conveying the rope includes conveying the rope at a speed of at least 100 feet per minute.

8. The method of claim 1, wherein cutting the rope includes operating the rotary cutter to perform at least 5,000 cuts per minute.

9. The method of claim 8, wherein the rotary cutter includes eight blades secured about a perimeter of a support plate, and further wherein operating the rotary cutter includes rotating the support plate at a speed of 625 rpm.

10. The method of claim 1, further comprising:

engaging the rope between a drive roller and a conveyor proximate the rotary cutter.

11. The method of claim 10, further comprising:

operating the drive roller at a rotational speed corresponding with a feed rate of the conveyor.

12. The method of claim 1, wherein cutting the rope with the rotary cutter includes forming pieces having a thickness of less than 0.125 inch.

13. The method of claim 1, wherein extruding the rope includes forming a plastic extrudate.

14. The method of claim 1, wherein extruding the rope includes forming a heated extrudate.

15. The method of claim 1, wherein extruding the rope includes forming a deformable extrudate.

16. The method of claim 1 wherein the rotary cutter is rotated such that the blades strike the rope from above.

17. The method of claim 1, further comprising:
simultaneously conveying a plurality of laterally spaced ropes of aerated confectionery foam from at least one extruder to the rotary cutter;
supporting the plurality of blades through at least three substantially parallel and laterally spaced support plates of the rotating cutter; and
driving the rotary cutter through the support plates to simultaneously cut the pieces from the plurality of ropes.

18. A method of processing at least one rope of aerated confectionery foam, the method comprising:
extruding at least one rope of aerated confectionery foam from an extruder;
conveying the rope from the extruder to a rotary cutter;
applying an anti-sticking agent to the rope as the rope is conveyed from the extruder to the rotary cutter; and
cutting the rope into pieces with the rotary cutter, wherein cutting the rope includes forming pieces having length:thickness aspect ratio in the range 32:5–48:5.

19. The method of claim 18, wherein the rotary cutter includes eight blades secured about a perimeter of a support plate, and further wherein operating the rotary cutter includes rotating the support plate at a speed of 625 rpm.

20. The method of claim 18, wherein cutting the rope with the rotary cutter includes forming pieces having a thickness of less than 0.125 inch.

21. The method of claim 18, further comprising:
simultaneously conveying a plurality of laterally spaced ropes of aerated confectionery foam from at least one extruder to the rotary cutter;
supporting the plurality of blades through at least three substantially parallel and laterally spaced support plates of the rotating cutter; and
driving the rotary cutter through the support plates to simultaneously cut the pieces from the plurality of ropes.

* * * * *